Feb. 19, 1957 H. M. DIAMBRA ET AL 2,782,379

DIRECTIONAL LINE SPLITTING COUPLER

Filed Dec. 24, 1953 2 Sheets-Sheet 1

INVENTORS

Henry M. Diambra & George G. Edlen

BY Max L. Libman

ATTORNEY

DIRECTIONAL LINE SPLITTING COUPLER

Filed Dec. 24, 1953 2 Sheets-Sheet 2

INVENTORS

Henry M. Diambra & George G. Edlen

BY Max L. Libman

ATTORNEY

United States Patent Office 2,782,379 Patented Feb. 19, 1957

2,782,379

DIRECTIONAL LINE SPLITTING COUPLER

Henry M. Diambra, Washington, D. C., and George G. Edlen, Silver Spring, Md., assignors to Entron, Inc., Bladensburg, Md., a corporation of Delaware Application December 24, 1953, Serial No. 400,256

6 Claims. (Cl. 333—35)

This invention relates to devices for connecting a single high frequency coaxial cable (such as is used for conveying television signals from a master antenna to a large number of television receivers) to two or more coaxial cables for the purpose of transmitting high frequency signals from a single source (e. g., the antenna) to a number of widely separated utilization stations. The invention is particularly useful in connection with (although not limited to) community antenna systems such as are used to enable communities in fringe areas to receive television broadcast programs. In such installations, the master antenna system placed in an advantageous location receives the desired programs which are then suitably amplified and transmitted directly by a coaxial cable system, usually with the aid of repeater amplifiers, to the sets of individual subscribers in the community. It therefore becomes necessary at many points in the distribution system to branch one transmission line into two or more subsidiary lines. At each such junction there is necessarily discontinuity in the coaxial transmission line, and as is well known, each such discontinuity represents a loss in the system. Unless the coupling between the tranmission line and the branch line is carefully matched, this loss may be very considerable and result in both poor reception and the requirement of additional amplification, which is a major factor of expense in such systems, since, as previously stated, a fair-sized system will require may such branchings.

It is a primary object of the invention to provide an inexpensive, highly efficient line splitting coupler of novel construction which is exceedingly compact and may readily be installed without the use of special tools or soldering, by relatively unskilled personnel, and which is directional in that it presents an optimum impedance in the direction from the main line to the branch line and a maximum impedance in the opposite direction in order to isolate the lines from each other so as to prevent local oscillator interference and to minimize "ghosts" and other interference phenomenon.

A further object of the invention is to provide a directional coupler which is weather-proof and which may readily be completely hermetically sealed so as to be entirely impervious to moisture conditions where such performance is required, yet is capable of rapid, solderless connection and disconnection into a utilization circuit.

The specific nature of the invention as well as other objects and advantages thereof will clearly appear from a description of a preferred embodiment as shown in the accompanying drawings, in which.

The characteristic impedance of standard coaxial cables commonly used in television community antenna systems is approximately 72 ohms, so the invention will be described on this basis, although it will be apparent that this value is exemplary and not limiting.

Figure 1:
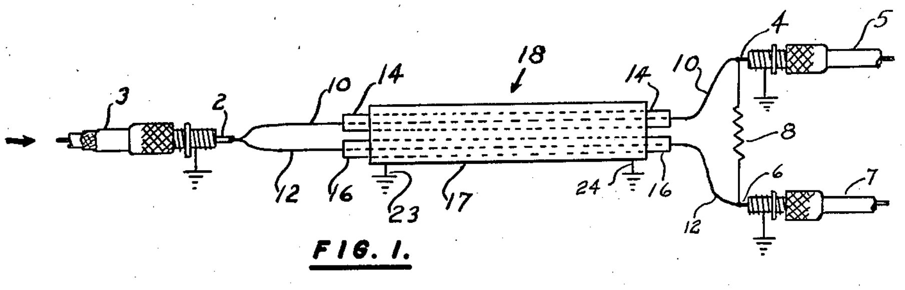
Fig. 1 is a schematic diagram showing the circuit connections of a two-branch coupler.

Referring to Fig. 1, the problem will be outlined in terms of the conditions required at the terminals of a directional isolating line splitting coupler for a 72 ohm coaxial line 3, which is to be connected to terminal 2, while two further 72 ohm lines or loads 5 and 7 are to be respectively connected to terminals 4 and 6. For a proper impedance match, looking in the direction of the arrow toward terminal 2, that is, from the main line 3 toward the two branch lines 5 and 7, the terminal 2 should present an impedance of 72 ohms; looking toward the branch lines from terminals 4 and 6, the impedance should be 72 ohms, but looking back from each terminal 4 or 6 toward the other through the coupler, a high-impedance should be presented thereby affording the desired isolation. These conditions can, of course, be met by the use of a resistance network, as is well known, but such a network involves a high power loss in the resistance elements through which the current must pass as well as the inevitable forward or nominal insertion loss of 3 decibels due to power division.

Figure 2:
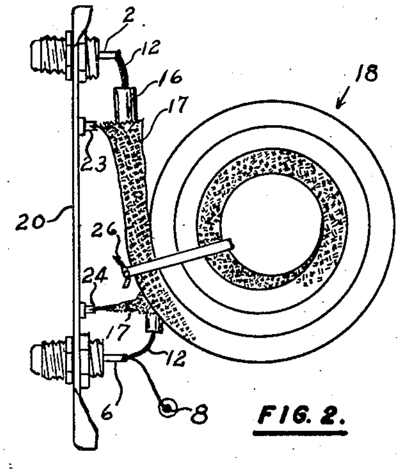
Fig. 2 is a side elevation of the assembled and mounted coupler of Fig. 1.
Figure 3:
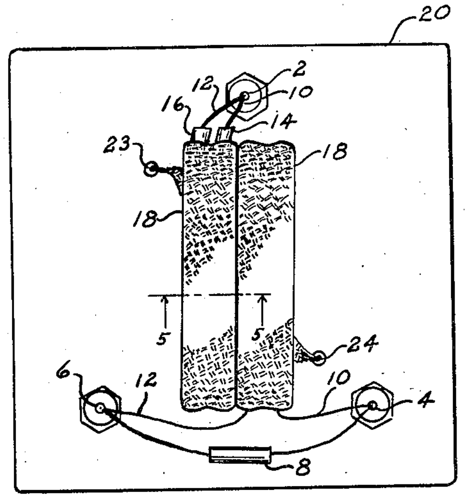
Fig. 3 is a back elevation of the coupler of Fig. 2.

Fig. 1 shows an arrangement according to the invention which obviates the above difficulty. Terminals 2, 4 and 6 are each represented as part of standard coaxial connectors, which will be mounted on a panel as shown in Figs. 2 and 3, but are shown extended and spaced in Fig. 1 for the purpose of illustrating the principle employed. Connected between terminals 2 and 4 is a conductor 10, of ¼ wave length for the frequency to be transmitted. A similar conductor 12 is connected between terminals 2 and 6. Each conductor is provided with a separate high quality insulating jacket 14 and 16 respectively, while about both jackets a braided flexible metallic conductor and grounded shield 18 is disposed. Since the impedance at the single terminal 2 is to be 72 ohms, the impedance of each terminal 4 and 6 looking from point 2 should be 144 ohms so that their parallel impedance will be $$\frac{144}{2}$$

or 72 ohms. Therefore the characteristic impedance of the dual cable considered as a matching section between a 72 ohm impedance and a 144 ohm impedance is given by the standard formula: $Z_0=\sqrt{Z_1 \times Z_2}=\sqrt{72 \times 144}=102$ ohms, and the cable must be constructed so as to have this impedance value. Resistance 8 is placed across terminals 4 and 6 to compensate for unbalanced loads at these terminals and should be at least approximately matched to their combined impedance; it should therefore be in the neighborhood of 204 ohms, but since for reasons given below it is desirable to lower the Q of the matching network, in practice a value of 150 ohms is used. An unwanted signal coming from equipment connected to terminal 6 sees an unbalanced impedance with respect to terminal 4 and in consequence suffers severe attenuation. This attenuation is due chiefly to two factors. The first factor involves the effect of the coupler considered as an impedance bridge due to the lumped resistance 8 and the distributed circuit parameters resulting from the peculiar physical structure of the coupler. The second factor involves the effect of phase cancellation. If conductors 10 and 12 represented two separate coaxial cables, their apparent impedance would vary as a function of frequency, and at the frequency for which the cables are a quarter wavelength (or some multiple thereof) there would be phase cancellation and maximum attenuation of approximately 20 db. However, the construction used, with a single external grounded shield 17, has a complex effect similar to that of a shielded balanaced line, and the Q of this line is adjusted so that the normal forward attenuation remains nominally constant in the frequency bands desired. At frequencies near the end of the band which is being passed, the circuit constants of the alternating current bridge are a major factor in producing a mismatch with respect to terminal 6, while at the frequency for which the coupler acts most nearly as a ½ wavelength section between terminals 4 and 6, the effect of phase cancellation is considerable. The exact computation of the effect is difficult because of the complex nature of the distributed circuit parameters, but in practice the attenuation is found to be adequate for the desired isolation between terminals. Thus interference between equipment on the respective terminals is kept to a minimum. Similarly, if there is no load on one of the terminals 4 or 6 and a load on the other, the resistance 8 serves to prevent attenuation which a parallel open line, acting as a ¼ wave length trap, would produce.

Figure 4:
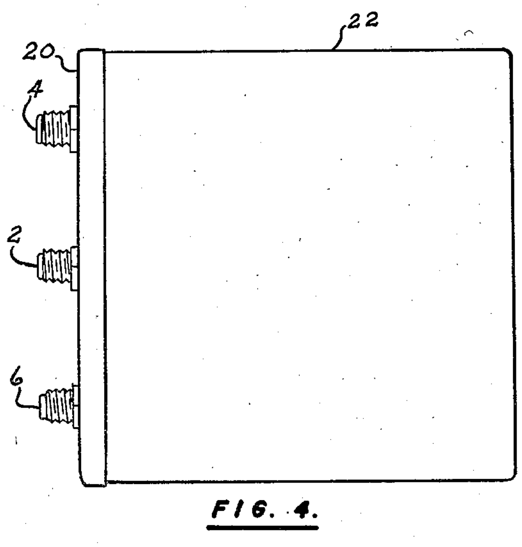
Fig. 4 is a plan view of the same coupler assembled in its casing.
Figure 5:
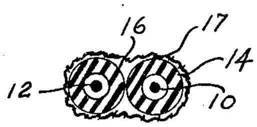
Fig. 5 is a sectional view taken on line 5—5 of Fig. 3.

Figs. 2 and 3 show the manner in which the circuit elements of Fig. 1 are physically arranged on a panel 20 which serves as a cover of a can 22 shown in Fig. 4, whereby the assembly may be made water-proof if desired, or hermetically sealed. The dual cable 18 is wound up into a tight double coil loop as shown, with the end of the cable 18 protruding from the outermost turn, one end from each coil, as will be clear from Figs. 2 and 3. The outer braid 17 is stripped back to expose the two inner insulated conductors and is soldered to a grounding lug 23 at one end of the cable and 24 at the other end. By making the innermost turn of the loop as small as possible, and tightly winding the successive outer turns, a compact assembly is formed which is then tied as shown at 26 with a strip of any suitable material to keep the turns in their tight and compact relationship. In this way, the outer shield is thoroughly grounded, each turn through the adjacent turns to ground, so that an extremely effective and efficient unit is produced. Also, each turn is shielded not only by its own braided conductor but by the braided conductor of the adjacent turns, which still further increases the efficiency of the braided conductor and hence of the unit as a whole.

Terminal 2 extends through panel 20 and may be any standard terminal connector, being shown as a conventional female coaxial fitting having a shell grounded to the casing and an insulated central conductor which is connected, as by soldering, to the common ends of central conductors 10 and 12 of cable 18. Terminal 6 is a similar fitting and is connected, as by soldering, to the other end of central conductor 12 while terminal 4 is similarly connected to the other end of conductor 10. Between terminals 4 and 6 the resistor 8 is connected, so that the electrical connections are exactly as in Fig. 1. The entire unit is now ready to connect a single input line 3 to lines 5 and 7.

Figure 6:
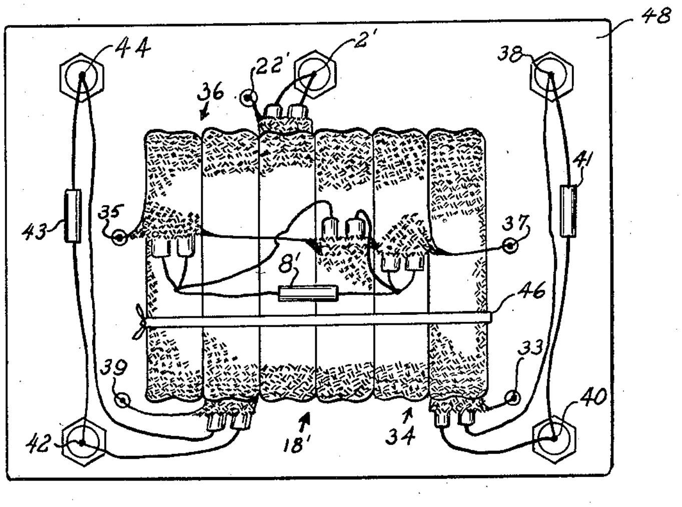
Fig. 6 is a rear elevation of a four-branch coupler assembled on its panel.
Figure 7:
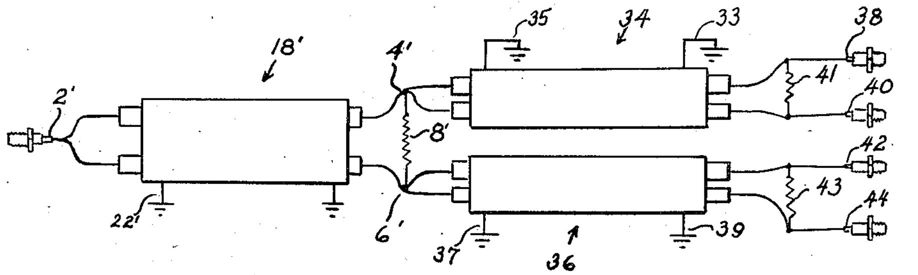
Fig. 7 is a developed diagram showing the circuit connection of the coupler of Fig. 6.

Figs. 6 and 7 show a four-terminal coupler for connecting a single input line to four outputs. The first section of the coupler is electrically exactly the same as cable 18, but each of its two outputs 4′ and 6′ is now connected to a similar cable 34 and 36. The two outputs of cable 34 are respectively connected to output fittings 38 and 40 and a resistor 41 of 150 ohms is connected between 38 and 40, while cable 36 is similarly connected to fittings 42 and 44 and has 150 ohm resistor 43 connected thereto. Physically, each cable is coiled as in Fig. 3 and the coils are placed in contiguous side-by-side relation, for which purpose tie strips 46 may be employed, and connected together as best shown in Fig. 6, the entire assembly being mounted on the rear of the front panel 48 of a suitable weather-proof or hermetically sealed box (not shown).

While the arrangement shown is described as suitable for one particular frequency of which cables 18, 38 and 36 are each ¼ wave length, and the Q of the cable would therefore be very high for that frequency and low for other frequencies, in practice, due to the distributed constants of the dual cable and shield arrangement, the effective Q is reduced sufficiently so that the cable acts not merely as a single frequency filter, but as a band pass filter, the design being made such, for television use, as to pass the band of frequencies from about 50 megacycles to 90 megacycles, which corresponds to the range of frequencies included in television channels 2 through 6. Also by favoring the frequencies in the neighborhood of 60 megacycles, i. e., centering the quarter wave length of the cable 18 at or near 60 megacycles, a second band of third harmonic frequencies is also passed by the assembly considered as a filter, in the range of 170–220 megacycles, i. e., the range of television channels 7 to 13, while the intermediate frequency range between these two groups of channels is highly attenuated by the filter. Thus, the frequency modulation band and the aircraft band of frequencies are not passed, while the desired television channels are passed with a minimum of attenuation of approximately 3.3 decibels per stage, of which 3 decibels represent the unavoidable power attenuation previously mentioned and the 0.3 decibel represents cable attenuation due to losses in the cable. For the arrangement of Figs. 6 and 7, the total attenuation between terminals 2′ and each of terminals 38, 40, 42 and 44 will be that of two sections in series, or approximately 6.6 decibels. Additional stages could, of course, be added, but the increase of 3.3 decibels per stage makes it generally inadvisable to use a non-passive coupling, i. e., one incorporating a stage of amplification, to raise the signal level to a useful value.

Figure 9:
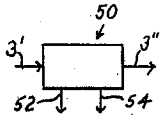
Fig. 9 is a schematic diagram of a two-branch hybrid coupler using the circuit of Fig. 8.
Figure 8:
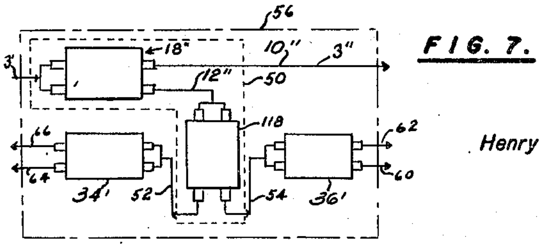
Fig. 8 is a schematic diagram showing the invention used as a hybrid coupler.

It will be apparent that the above-described coupler construction can also be used in various other combinations. For example, a hybrid coupler is shown in Fig. 8, that is, a coupler which consists essentially of a through trunk line with a number of subsidiary lines. The main line, 3′, is connected to a unit 18″ substantially identical with unit 18 of Fig. 1, which has two conductors 10″ and 12″. The continuing main line 3″ is connected to conductor 10″, whereby the attenuation of the signal supplied to 3″ is approximately 3.3 decibels as before; the other conductor 12″ is connected to a similar unit 118, which in turn may supply two units 34′ and 36′, corresponding to units 34 and 36 of Fig. 7; if 34′ and 36′ are omitted, and the elements contained within dotted line 50 are used in a suitable housing with connectors similar to those shown in Figs. 4 and 6, then a three-outlet hybrid is provided as shown in Fig. 9, having two branches 52 and 54 and a main line 3″. The branches 52 and 54 are, of course, 6.6 decibels down from the signal level on line 3′, while the main line continuation, 3″, is 3.3 decibels down.

Figure 10:
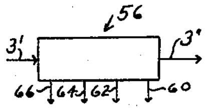
Fig. 10 is a similar schematic diagram of a four-branch hybrid coupler.

If the entire assembly shown within the dot-dash line 56 is used, the result is, as shown, in Fig. 10, a main line 3″ and four branch lines, 60, 62, 64 and 66, each of which carries the signal attenuated 9.9 decibels, while the attenuation at the continued main line 3″ is still 3.3 decibels as before. It will be obvious that other combinations can be provided as desired.

It will thus be seen that a compact, highly efficient directional coupler is provided for splitting the output of a line into two or more outputs. The unit is totally enclosed and provided with fittings for rapid, solderless attachment to a utilization circuit.

It will be apparent that the embodiments shown are only exemplary and that various modifications can be made in construction and arrangement within the scope of the invention as defined in the appended claims.

We claim:

1. A line-splitting directional coupler for connecting a main coaxial cable to a plurality of subsidiary coaxial lines, comprising a grounded panel, a main coaxial cable connector and two subsidiary coaxial cable connectors mounted on said panel for cable connection from the front thereof, a length of coupler cable mounted on the back of said panel, said coupler cable comprising two individually insulated one-quarter wavelength conductors surrounded by a common flexible grounded outer conductor, the coupler cable providing thereby two substantially one-quarter wavelength coaxial cables for the lowest frequency carried by said main coaxial cable, and having a characteristic impedance such that it serves as a matching section between the main cable and the respective subsidiary coaxial lines, said coupler cable being tightly coiled on itself with adjacent turns in electrical contact with each other at said flexible outer conductor, the insulated conductors of the coupler cable being connected together at one end to said main coaxial cable connector to form a common junction, each of the other ends of the coupler cable being connected respectively to one of said subsidiary cable connectors, and a resistor connected between the other ends of said insulated conductors, the Q of the coupler cable being sufficiently low so that the cable functions as a one-quarter wavelength transformer over a desired band of frequencies.

2. The invention according to claim 1, said coil being a double flat spiral coil with the center of the coupler cable at the innermost turn of each spiral and the respective ends of the coupler cable terminating the outer turn of the spiral.

3. The invention according to claim 2, and a weathertight enclosure in engagement with said panel and enclosing said coiled coupler cable and resistor.

4. A line splitting directional coupler for connecting a main coaxial cable to a plurality of subsidiary coaxial lines, comprising a grounded panel, a main coaxial cable connector and subsidiary coaxial cable connectors mounted on said panel for cable connection from the front thereof, a length of coupler cable mounted on the back of said panel, said coupler cable comprising two individually insulated one-quarter wavelength conductors surrounded by a common flexible grounded outer conductor, the coupler cable providing thereby two substantially one-quarter wavelength coaxial cables for the lowest frequency carried by said main coaxial cable, and having a characteristic impedance such that it serves as a matching section between the main cable and the respective subsidiary coaxial lines, said coupler cable being tightly coiled on itself with adjacent turns in electrical contact with each other at said flexible outer conductor, the insulated conductors of the coupler cable being connected together at one end to said main coaxial cable connector to form a common junction, and a resistor connected between the other ends of said insulated conductors, and two similar coiled coupler cables mounted in the rear of said panel on either side of the first coupler cable, each having a similar common junction at one end and a similar resistor across the other two ends, each said similar common junction being connected to a separate end of the first said resistor and one of said subsidiary coaxial connectors being connected to each of the ends of each said similar resistor, whereby the one main coaxial cable may be connected to four subsidiary cables.

5. The invention according to claim 4, said similar coiled coupler cables being adjacent to and in contact with said first coupler cable, the flexible outer conductors of the entire assembly being well grounded to each other and to said panel.

6. The invention according to claim 5, the entire assembly being housed in a weather-proof enclosure, of which said panel is the cover.

References Cited in the file of this patent

UNITED STATES PATENTS

| | | |
|---|---|---|
| 2,632,108 | Woodward | Mar. 17, 1953 |
| 2,660,710 | Blancher | Nov. 24, 1953 |